United States Patent
Jeong et al.

(10) Patent No.: US 9,432,958 B2
(45) Date of Patent: Aug. 30, 2016

(54) METHOD AND ITS APPARATUS FOR TRANSMITTING A CONTINUOUS SIGNAL

(71) Applicant: Samsung Electronics Co., Ltd., Gyeonggi-do (KR)

(72) Inventors: Cheol Jeong, Gyeonggi-do (KR); Hyun-Kyu Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 14/303,480

(22) Filed: Jun. 12, 2014

(65) Prior Publication Data
US 2014/0369341 A1   Dec. 18, 2014

(30) Foreign Application Priority Data

Jun. 12, 2013 (KR) .......... 10-2013-0067338
Jun. 12, 2014 (KR) .......... 10-2014-0071439

(51) Int. Cl.
*H04W 56/00* (2009.01)

(52) U.S. Cl.
CPC .............. *H04W 56/0045* (2013.01)

(58) Field of Classification Search
CPC .................................. H04W 56/0045
See application file for complete search history.

(56) References Cited

U.S. PATENT DOCUMENTS

| 8,391,272 B2 | 3/2013 | Cai et al. |
| 8,606,336 B2 | 12/2013 | Womack et al. |
| 2009/0046641 A1 | 2/2009 | Wang et al. |
| 2009/0239476 A1* | 9/2009 | Womack ............... H04L 5/0094 455/68 |
| 2011/0170535 A1 | 7/2011 | Wang et al. |
| 2011/0292917 A1 | 12/2011 | Fan et al. |
| 2012/0063448 A1 | 3/2012 | Cai et al. |
| 2012/0129561 A1 | 5/2012 | Peng et al. |
| 2013/0272231 A1* | 10/2013 | Dinan ................... H04W 52/34 370/329 |
| 2013/0279433 A1* | 10/2013 | Dinan ............... H04W 56/0005 370/329 |
| 2013/0308594 A1* | 11/2013 | Takamatsu .......... H04W 28/044 370/329 |

FOREIGN PATENT DOCUMENTS

KR   10-2012-0023794 A   3/2012

OTHER PUBLICATIONS

International Search Report dated Sep. 22, 2014 in connection with International Patent Application No. PCT/KR2014/005169; 4 pages.
Written Opinion of International Searching Authority dated Sep. 22, 2014 in connection with International Patent Application No. PCT/KR2014/005169; 6 pages.

* cited by examiner

*Primary Examiner* — Paul H Masur

(57) ABSTRACT

A method for continuous signal transmission and an electronic device thereof are provided. The continuous signal transmission method of the electronic device includes obtaining TA corresponding to each of the continuous plurality of radio frames, determining the transmission order of the continuous plurality of radio frames on the basis of the TA values, and transmitting the continuous plurality of radio frames in accordance to the determined order.

20 Claims, 10 Drawing Sheets

METHOD AND ITS APPARATUS FOR TRANSMITTING A CONTINUOUS SIGNAL

PRIORITY

The present application is related to and claims priority under 35 U.S.C. §119(a) to a Korean Patent Application entitled filed in the Korean Intellectual Property Office on Jun. 12, 2013 and assigned Serial No. 10-2013-0067338 and a Korean Patent Application entitled filed in the Korean Intellectual Property Office on Jun. 12, 2014 and assigned Serial No. 10-2014-0071439, the contents of which are herein incorporated by reference.

TECHNICAL FIELD

The present disclosure relates to an electronic device of a wireless communication system. More particularly, the present disclosure relates to a method and apparatus for transmitting a continuous signal in the electronic device.

BACKGROUND

Commonly, a wireless communication system consisting of a Base Station (BS) and a terminal (hereinafter, referred to as "electronic device") uses a DownLink (DL) channel and an UpLink (UL) channel. That is, the BS can transmit a data signal and a control signal to the electronic device through the downlink channel. In response to the signals received from the BS, the electronic device can transmit an Acknowledgement (ACK) signal or a user data signal to the BS through the uplink channel. Further, the electronic device can transmit an uplink Sounding Reference Signal (SRS) to the BS such that the BS can measure an uplink channel quality. Generally, due to a distance and propagation delay between a BS and an electronic device, time taken for uplink reference signals transmitted by different electronic devices to reach the BS can be different. Therefore, there is a need to improve these systems and method while minimizing performance deterioration and overhead increase.

SUMMARY

To address the above-discussed deficiencies, it is a primary object to provide a method and apparatus in which an electronic device transmits a continuous plurality of radio frames in a wireless communication system.

In a first example, a method and apparatus in which an electronic device can align a continuous plurality of radio frames on the basis of Timing Advancement (TA) for each of the continuous plurality of radio frames and transmit the aligned radio frames in a wireless communication system.

In a second example, a method and apparatus in which a Base Station (BS) can notify a terminal of the permission or non-permission of a change of transmission order of radio frames in a wireless communication system.

In a third example, a method and apparatus in which an electronic device can transmit a plurality of radio frames on the basis of a radio frame order determined by a BS.

In a fourth example, a method for transmitting a continuous plurality of radio frames in an electronic device is provided. The method includes obtaining TA corresponding to each of the continuous plurality of radio frames, determining the transmission order of the continuous plurality of radio frames on the basis of the TA values, and transmitting the continuous plurality of radio frames in accordance to the determined order.

In a fifth example, a method for receiving a continuous plurality of radio frames in a reception node is provided. The method includes estimating TA for uplink synchronization of an electronic device on the basis of a signal received from the electronic device, determining the permission or non-permission of a change of transmission order of the continuous plurality of radio frames to be transmitted by the electronic device, and transmitting to the electronic device a control signal that includes the estimated TA and the permission or non-permission of the change of transmission order of the continuous plurality of radio frames.

In a sixth example, an electronic device for transmitting a continuous plurality of radio frames to a BS in a wireless communication system is provided. The electronic device includes a transmission/reception unit configured to obtain TA corresponding to each of the continuous plurality of radio frames, and a control unit configured to determine the transmission order of the continuous plurality of radio frames on the basis of the TA values, and transmit the continuous plurality of radio frames in accordance to the determined order.

In a seventh example, a reception node for receiving a continuous plurality of radio frames in a wireless communication system is provided. The reception node includes a control unit configured to estimate TA for uplink synchronization of an electronic device on the basis of a signal received from the electronic device, and determine the permission or non-permission of a change of transmission order of the continuous plurality of radio frames to be transmitted by the electronic device, and a transmission/reception unit configured to transmit to the electronic device a control signal that includes the estimated TA and the permission or non-permission of the change of transmission order of the continuous plurality of radio frames.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
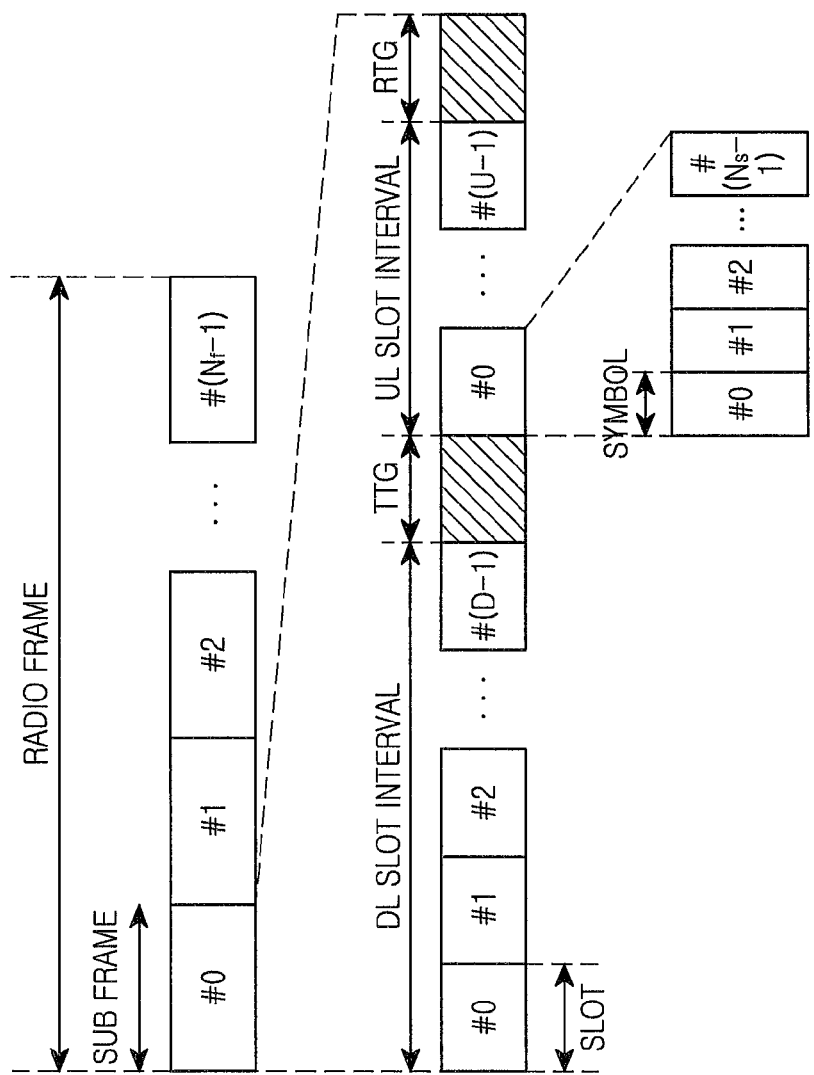
FIG. 1 is an example diagram illustrating a radio frame structure of a Time Division Duplex (TDD) method in a wireless communication system according to this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In describing the present invention, well-known functions or constructions are not described in detail since they would obscure the invention in unnecessary detail. And, terms described below, which are defined considering functions in the present invention, can be modified in accordance to user and operator's intention or practice. Therefore, the terms should be defined on the basis of the content throughout the present specification.

In the following description, an electronic device can be a mobile communication terminal supporting wireless communication, a smart phone, a tablet Personal Computer (PC), a navigator, a laptop, and a netbook. Commonly, a wireless communication system can be consisting of a Base Station (BS) and a terminal (hereinafter, referred to as "electronic device") uses a DownLink (DL) channel and an UpLink (UL) channel. That is, the BS can transmit a data signal and a control signal to the electronic device through the downlink channel. In response to the signals received from the BS, the electronic device can transmit an Acknowledgement (ACK) signal or a user data signal to the BS through the uplink channel. Further, the electronic device can transmit an uplink Sounding Reference Signal (SRS) to the BS such that the BS can measure an uplink channel quality.

Generally, due to a distance and propagation delay between a BS and an electronic device, time taken for uplink reference signals transmitted by different electronic devices to reach the BS can be different. Therefore, the BS can estimate and transmit Timing Advancement (TA) to the terminal for the sake of uplink synchronization of the terminal, and the terminal can reflect the received TA and adjust the transmission timing of the uplink reference signal, thereby achieving the uplink synchronization between the terminal and the BS.

Also, an electronic device can transmit a plurality of uplink sounding reference signals using a continuous plurality of radio frames. For example, in a system in which a plurality of BSs cooperate for the purpose of increasing a transmission capacity of an uplink and enhancing a reliability of signal transmission, an electronic device can transmit a sounding reference signal to each of a plurality of BSs using a continuous plurality of radio frames. In a beamforming system, an electronic device can transmit a sounding reference signal to a specific BS through a plurality of beams, using a continuous plurality of radio frames. In an Ad-hoc wireless network consisting of a plurality of electronic devices, an electronic device can transmit a reference signal to the plurality of electronic devices using a continuous plurality of radio frames. In such systems, TA for each of the continuous plurality of radio frames can be set differently from one another. This can cause a situation in which the transmission timing of the plurality of radio frames can be overlapped (or duplicated) with each other. For instance, in a situation in which an electronic device has to transmit an uplink sounding reference signal to two BSs using continuous $1^{st}$ and $2^{nd}$ radio frames, if a TA value of the $2^{nd}$ radio frame is greater than a TA value of the $1^{st}$ radio frame, the end of the $1^{st}$ radio frame and the front of the $2^{nd}$ radio frame can overlap with each other. To solve this problem, a method of decreasing a length of a radio frame, or setting a guard interval between radio frames, or not transmitting the front of a later transmitted radio frame among the radio frames of which the transmission timing are overlapped with each other, can be used. However, in a case of decreasing the length of the radio frame, performance deterioration can take place and, in a case of adding the guard interval, overhead can increase. Also, in a case of an Orthogonal Frequency Division Multiple Access (OFDMA) radio frame, there can be a disadvantage in which overhead increases because not transmitting the overlapped portion requires setting a length of a cyclic prefix long enough to prevent performance deterioration.

Accordingly, there can be a need to provide a method capable of, in a situation of having to transmit a continuous plurality of radio frames having different TA, transmitting the continuous plurality of radio frames without performance deterioration or overhead increase.

The present disclosure described below can be applied to systems as follows. For example, the present disclosure can be applied to a case in which, in a system in which a plurality of BSs cooperate, an electronic device can transmit a continuous plurality of radio frames having different TA values to each of the plurality of BS. The present disclosure can be applied to a case in which, in a beamforming system, an electronic device transmits a continuous plurality of radio frames having different TA values to one BS using a plurality of beams. The present disclosure can be applied to a case in which, in an Ad hoc system, an electronic device transmits a continuous plurality of radio frames having different TA values to each of a plurality of electronic devices.

FIG. 1 illustrates an example radio frame structure of a Time Division Duplex (TDD) method in a wireless communication system according to this disclosure. In the following description, for convenience, the radio frame structure of the TDD method can be described by way of example. But, the present specification described below can be applied even to a Frequency Division Duplex (FDD) method without being limited to the TDD method.

As illustrated in FIG. 1, one radio frame can be comprised of the '$N_f$' number of sub frames, and one sub frame can be comprised of the 'D' number of downlink slots, a Transmit Transition Gap (TTG), the 'U' number of uplink slots, and a Receive Transition Gap (RTG). The TTG, which can be a guard interval between a downlink slot and an uplink slot in a TDD system, can perform a role of preventing a downlink signal of each BS from having interference in uplink signals of neighboring other BSs. One TTG can be set considering a time required for the BS to convert from a transmission mode into a reception mode and for the electronic device to convert from the reception mode into the transmission mode. The RTG, which can be a guard interval between an uplink slot and a downlink slot in the TDD system, can be set considering a time required for the BS to convert the reception mode into the transmission mode and for the electronic device to convert the transmission mode into the reception mode. Further, one uplink slot can be comprised of the '$N_S$' number of symbols.

Figure 2:
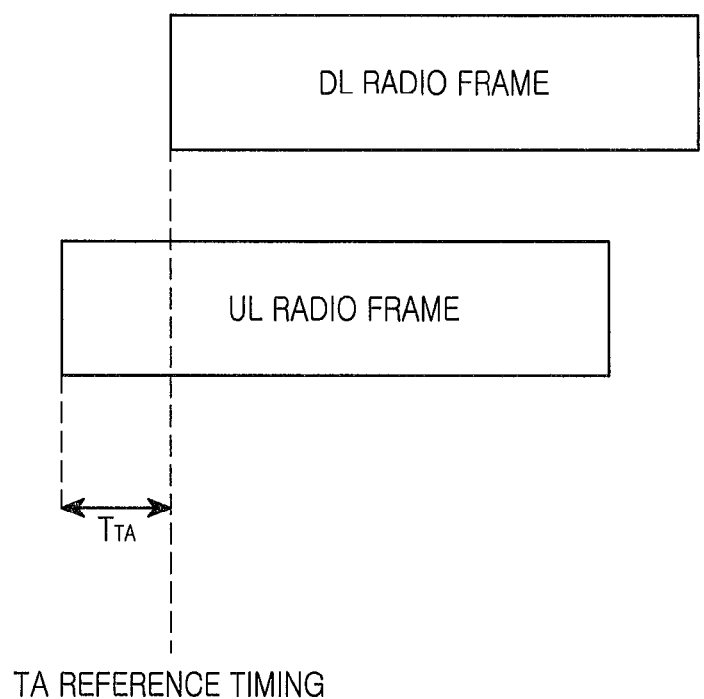
FIG. 2 is an example diagram illustrating a time relationship between a downlink radio frame and an uplink radio frame according to this disclosure.

FIG. 2 illustrates an example of a time relationship between a downlink radio frame and an uplink radio frame according to this disclosure.

Referring to FIG. 2, an electronic device can receive a downlink synchronization signal from a BS, and set synchronization of a downlink radio frame on the basis of the received downlink synchronization signal. Also, while the BS performs connection to a wireless communication system through random access, the BS can estimate a TA value of an uplink radio frame for the sake of uplink synchronization of the electronic device. After that, the BS can transmit the estimated TA value to the electronic device. If the TA value is received, the electronic device can set the transmission timing of a downlink radio frame as TA reference timing, and transmit an uplink radio frame earlier a time ($T_{TA}$) corresponding to TA than the TA reference timing. That is, the BS can estimate a TA value for each of a plurality of electronic devices and transmit the estimated TA value to a corresponding electronic device such that uplink radio frames from the plurality of electronic devices arrive at the BS at the same time.

Figure 3:
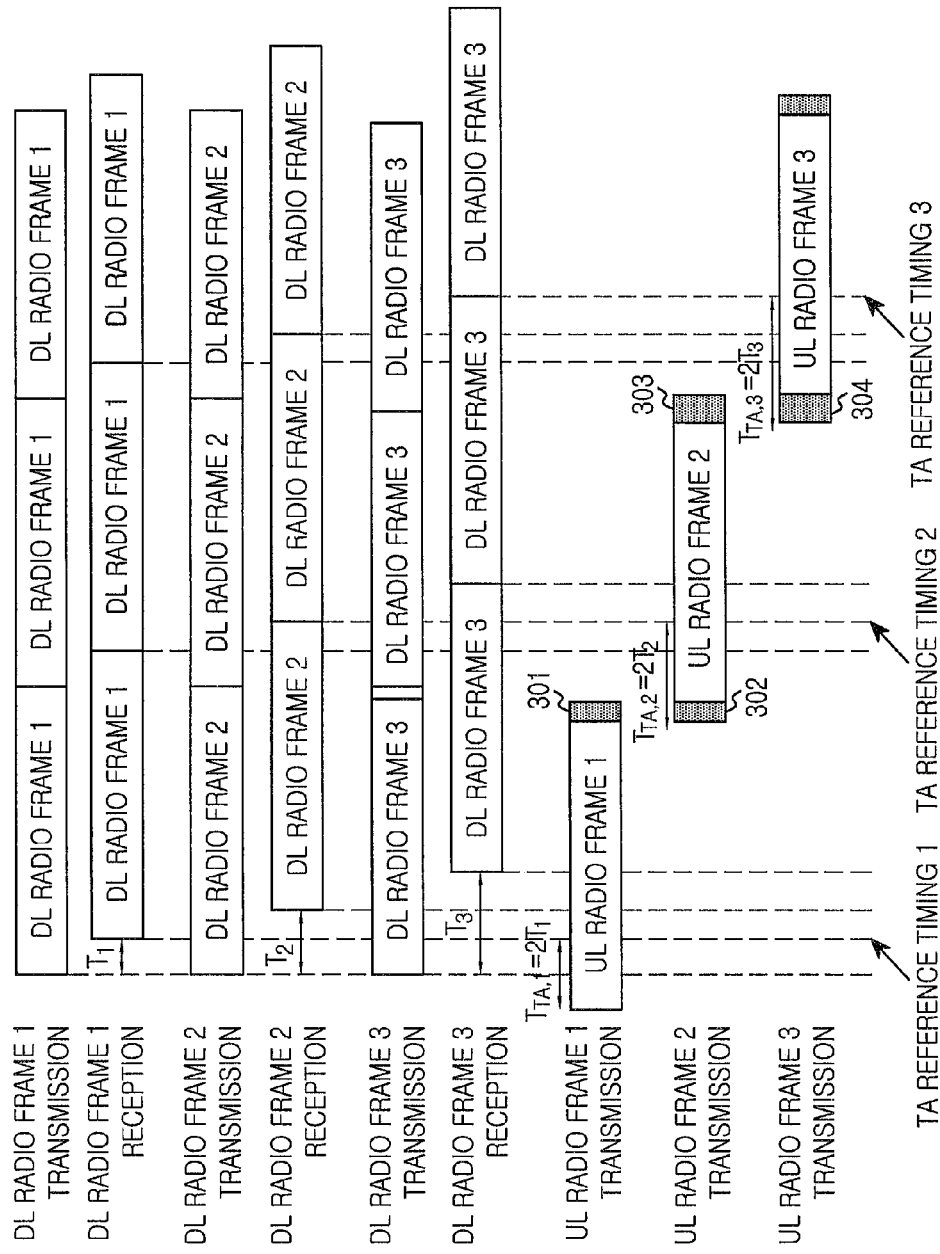
FIG. 3 is an example diagram illustrating a transmission of continuous uplink radio frames to a Base Station (BS) in an electronic device according to this disclosure.

FIG. 3 illustrates an example of a transmission of continuous uplink radio frames to a BS in an electronic device according to this disclosure.

In an embodiment, it can be assumed that respective TA values of an uplink radio frame 1, an uplink radio frame 2, and an uplink radio frame 3 are called $T_{TA,1}$, $T_{TA,2}$, and $T_{TA,3}$, and the $T_{TA,1}$, $T_{TA,2}$, and $T_{TA,3}$ have different values and satisfy $T_{TA,3} > T_{TA,2} > T_{TA,1}$. Also, it can be assumed that lengths of the uplink radio frame 1, the uplink radio frame 2, and the uplink radio frame 3 are all the same as one another. Here, the uplink radio frame 1, the uplink radio frame 2, and the uplink radio frame 3 can be uplink radio frames transmitted to one BS through different transmission beams, and can be uplink radio frames transmitted to different BSs or different electronic devices.

Referring to FIG. 3, the electronic device can advance the uplink radio frames 1, 2, and 3 by the $T_{TA,1}$, $T_{TA,2}$, and $T_{TA,3}$ on a basis of TA reference timing 1, 2, and 3, respectively, and transmit the uplink radio frames 1, 2, and 3 in order. At this time, because the $T_{TA,2}$ value is larger than the $T_{TA,1}$, the transmission timing of the end 301 of the uplink radio frame 1 and the transmission timing of the front 302 of the uplink radio frame 2 can be overlapped with each other. Further, because the $T_{TA,3}$ value is larger than the $T_{TA,2}$, the transmission timing of the end 303 of the uplink radio frame 2 and transmission timing of the front 304 of the uplink radio frame 3 can be overlapped with each other.

An exemplary embodiment of the present invention provides a method for transmitting radio frames without overlapping the transmission timing of the radio frames with each other.

Figure 4A:
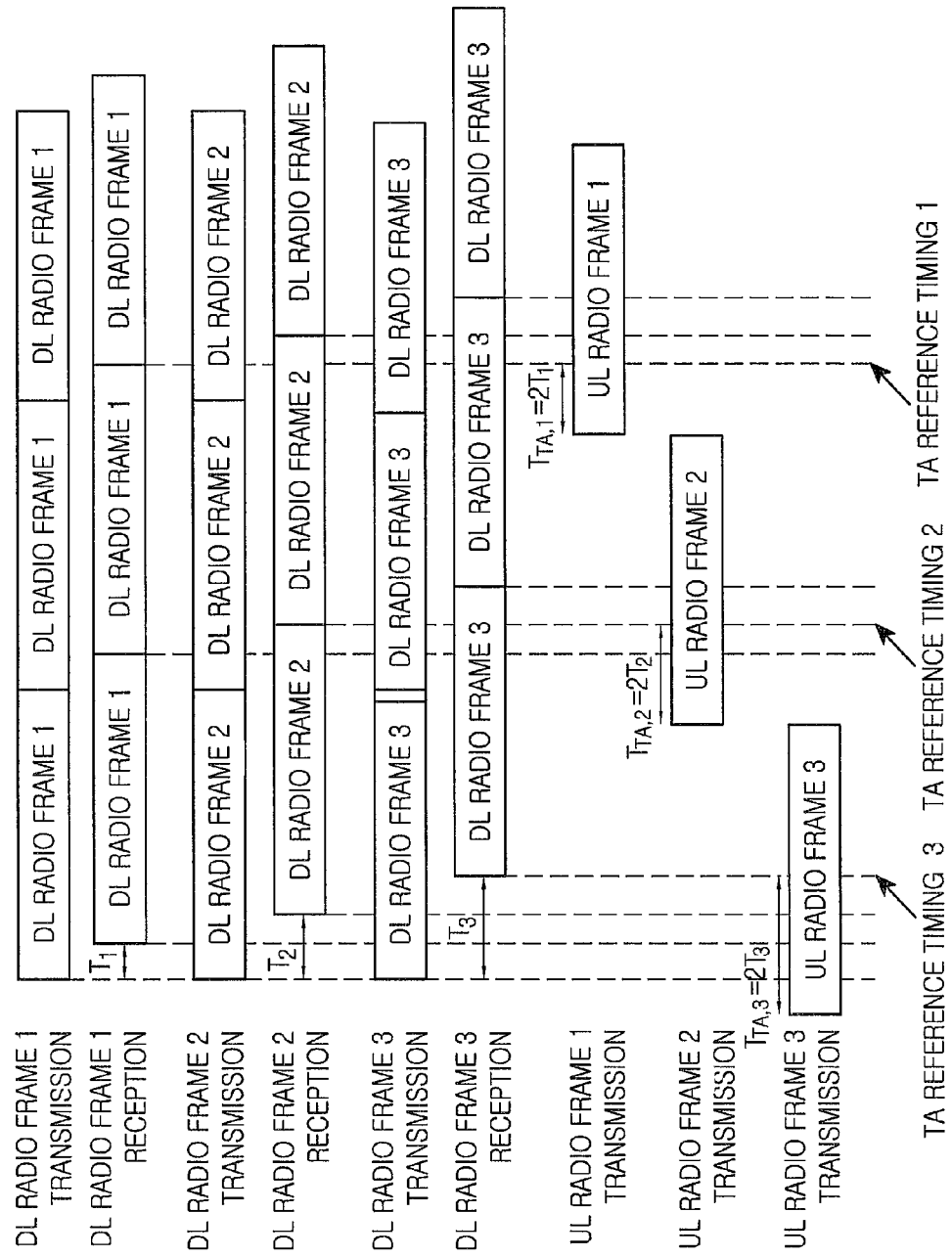
FIG. 4A is an example diagram illustrating a transmission of uplink radio frames aligned in accordance to TA of the uplink radio frames in an electronic device according to this disclosure.

FIG. 4A illustrates an example of a transmission of uplink radio frames aligned in accordance to TA of the uplink radio frames in an electronic device according to this disclosure.

As illustrated in FIG. 4A, to solve a problem of the existence of an overlapped region between uplink radio frames, an electronic device can align the uplink radio frames in descending order in accordance to the sizes of TA values. Because the sizes of the TA values are small in order of $T_{TA,3}$, $T_{TA,2}$, and $T_{TA,1}$, the electronic device can align three uplink radio frames in descending order in accordance to the sizes of the TA values, and align the three uplink radio frames in order of uplink radio frame 3, uplink radio frame 2, and uplink radio frame 1. If the electronic device transmits by aligning the three uplink radio frames in order of uplink radio frame 3, uplink radio frame 2, and uplink radio frame 1 in accordance to the sizes of the TA values, this can address the problem that the transmission timing of the uplink radio frames are overlapped with one another. At this time, if other uplink radio frame is transmitted before the uplink radio frame 3 having the largest TA value, this can cause a situation in which the transmission timing of the uplink radio frame 3 and the previous transmission timing of the other uplink radio frame are overlapped with each other. Accordingly, a BS may not allocate an uplink resource to a radio frame before a continuous plurality of radio, or allocate a resource from a region in which an uplink resource starts in an interval changing from a downlink region of TDD to the uplink resource. By doing so, the transmission timing of the plurality of radio frames from being overlapped with each other, although realigning the plurality of radio frames on the basis of TA values can be prevented.

Figure 4B:
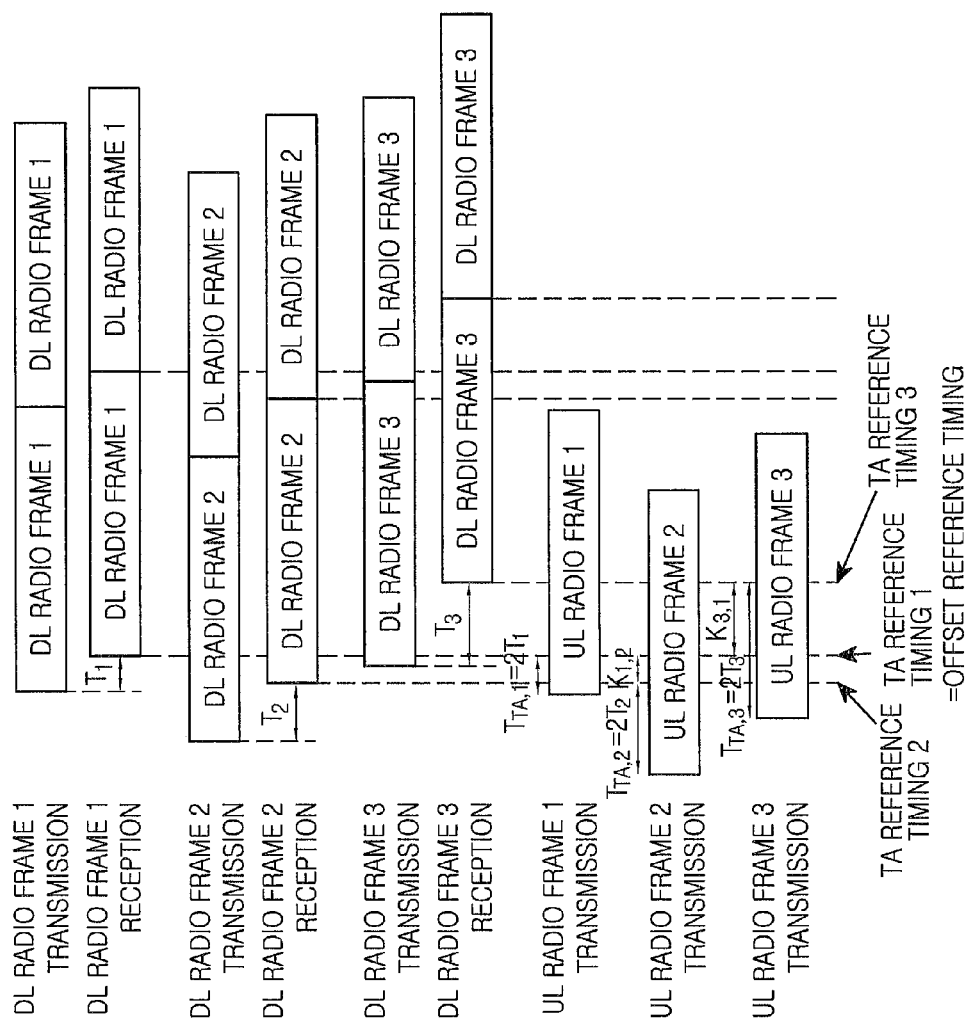
FIG. 4B is an example diagram illustrating an aligning of uplink radio frames in accordance to TA of the uplink radio frames and an offset value in an electronic device according to this disclosure.

FIG. 4B illustrates an example of aligning uplink radio frames in accordance to TA of the uplink radio frames and an offset value in an electronic device according to this disclosure.

Referring to FIG. 4B, the transmission timing of downlink radio frames 1, 2, and 3 can be different from one another. When the transmission timing of the downlink radio frames 1, 2, and 3 are different from one another as such, offset values compensating the differences of the transmission timing of the downlink radio frames 1, 2, and 3 can be added to TA values of uplink radio frames to align the uplink radio frames. At this time, a terminal can determine one reception timing among the reception timing of a plurality of downlink radio frames as offset reference timing. For description convenience, a description can be made on the assumption that the offset reference timing is the reception timing of the downlink radio frame 1. At this time, $K_{m,n}$, denotes a value subtracting the reception timing of a downlink radio frame (n) from the reception timing of a downlink radio frame (m). For example, $K_{3,1}$ can be a value subtracting the reception timing of the downlink radio frame 1 from reception timing of the downlink radio frame 3, and $K_{1,2}$ can be a value subtracting the reception timing of the downlink radio frame 2 from the reception timing of the downlink radio frame 1. At this time, αm denotes a value subtracting the reception timing of the downlink radio frame (m) from the offset reference timing (such as the reception timing of the downlink radio frame 1). The αm is an offset value for compensating the difference of the transmission timing of the downlink radio frame m. For example, α can be equal to '0', α2 can be equal to $K_{1,2}$, and α3 can be $-K_{3,1}$. To transmit the uplink radio frames such that a region overlapped between symbols does not exist, the uplink radio frames can be aligned in descending order of $T_{TA,m}+\alpha m$ values and transmitted in order of radio frames of large $T_{TA,m}+\alpha m$ values. For example, the electronic device transmits by aligning the three uplink radio frames in order of uplink radio frame 2, uplink radio frame 3, and uplink radio frame 1, as illustrated in FIG. 4B.

Figure 5:
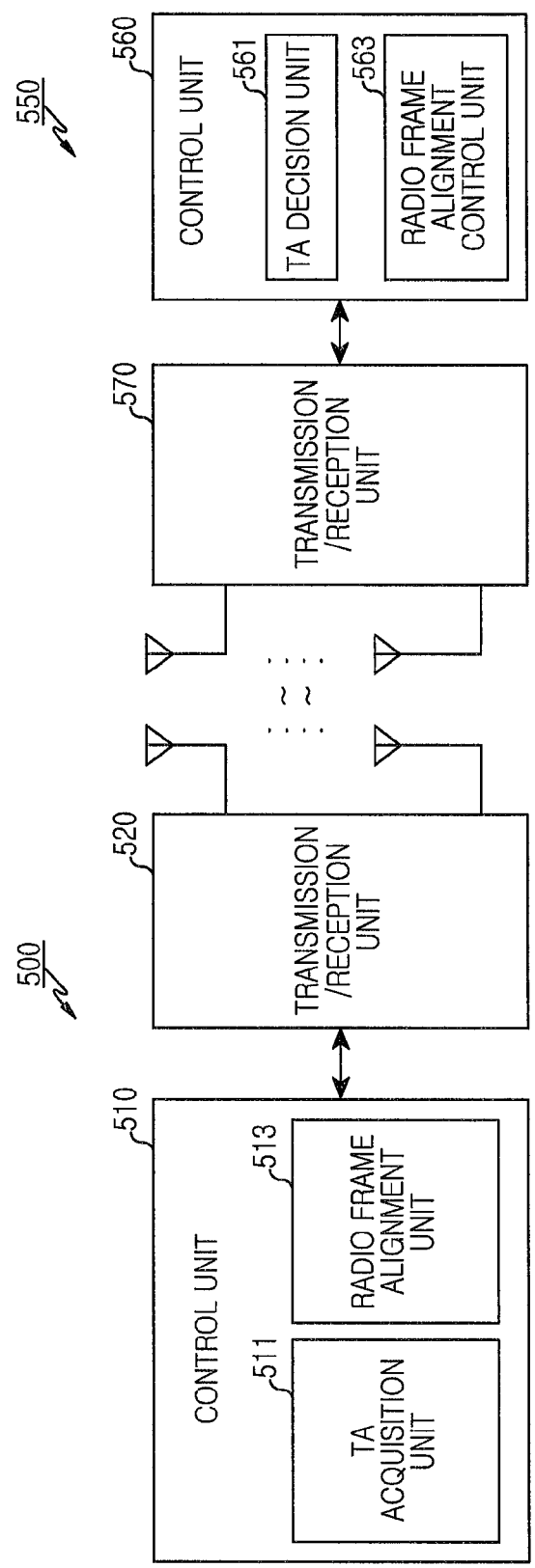
FIG. 5 is an example block diagram illustrating a constructions of an electronic device and a reception node according to this disclosure.

FIG. 5 illustrates example constructions of an electronic device and a reception node according to this disclosure. Here, for description convenience, a description can be made on the assumption that a reception node is a BS. But, the reception node can be also a counterpart electronic device communicating with the electronic device.

Referring to FIG. 5, the electronic device 500 can include a control unit 510 and a transmission/reception unit 520. The control unit 510 of the electronic device 500 can include a TA acquisition unit 511 and a radio frame alignment unit 513. Also, the reception node 550 can include a control unit 560 and a transmission/reception unit 570. The control unit 560 of the reception node 550 can include a TA decision unit 561 and a radio frame alignment control unit 563.

The control unit 510 of the electronic device 500 can perform the general control of the electronic device 500. The control unit 510 can control and process a function for receiving a control signal for uplink signal transmission from the BS being the reception node through the transmission/reception unit 520, align a continuous plurality of uplink radio frames on the basis of the received control signal, and transmit the continuous plurality of uplink radio frames to the BS in accordance to aligned order. Particularly, the control unit 510 can align a plurality of uplink radio frames on the basis of a TA value of each of the plurality of uplink radio frames included in the control signal.

The TA acquisition unit 511 can analyze a control signal for a sounding reference signal received from the BS through the transmission/reception unit 520, and acquire a TA value of each of a continuous plurality of uplink radio frames. For example, the TA acquisition unit 511 obtains a TA value of each of a continuous plurality of uplink radio frames from a control signal for a sounding reference signal. For another example, the TA acquisition unit 511 obtains a TA value of at least one uplink radio frame from a control signal for a sounding reference signal, and estimates a TA value of each of other uplink radio frames based on the obtained TA value.

The radio frame alignment unit 513 can determine the permission or non-permission of a change of transmission order of radio frames from a control signal for uplink signal transmission, such as a control signal for a sounding reference signal. That is, the control signal for the sounding reference signal can include a flag indicating whether the electronic device 500 can change the transmission order of a plurality of continuous radio frames. In other words, the radio frame alignment unit 513 can change the transmission order of a continuous plurality of radio frames by aligning the continuous plurality of radio frames on the basis of a preset order or a TA value in accordance to a flag indicating the change or non-change of transmission order of radio frames, or maintain the original transmission order without aligning the continuous plurality of radio frames. For example, if the flag 'FLAG_ORDER_CHANGE' value of the received control signal for the sounding reference signal is equal to '0', the radio frame alignment unit 513 can transmit the continuous plurality of radio frames in accordance to a preset order. At this time, if the transmission order of the radio frames is included in the received control signal for the sounding reference signal, the radio frame alignment unit 513 can align and transmit the continuous plurality of radio frames in accordance to the transmission order of the radio frames included in the control signal for the sounding reference signal. If the flag 'FLAG_ORDER_CHANGE' value of the received control signal for the sounding reference signal is equal to '1', the radio frame alignment unit 513 can align the continuous plurality of uplink radio frames for transmitting the sounding reference signal in descending order on the basis of a TA value of each of the continuous plurality of uplink radio frames. After that, the radio frame alignment unit 513 can control and process a function for transmitting the sounding reference signal to the BS in accordance to aligned order. For another example, If the flag 'FLAG_ORDER_CHANGE' value of the received control signal for the sounding reference signal is equal to '1', the radio frame alignment unit 513 can align the continuous plurality of uplink radio frames for transmitting the sounding reference signal in descending order on the basis of a TA value of each of the continuous plurality of uplink radio frames and an offset value of each of the continuous plurality of uplink radio frames. The offset value is a value subtracting the reception timing of a corresponding downlink radio frame from the reception timing of specific downlink radio frame.

If the TA value has not been successfully received from the BS, the radio frame alignment unit 513 can decide an arbitrary TA value for a corresponding BS or a corresponding beam. For example, when the BS has transmitted a TA value for a plurality of beam pairs or at least one BS to the electronic device 500 but the electronic device 500 fails to successfully receive the corresponding TA value due to error occurrence, the electronic device 500 can decide an arbitrary TA value. When the reception timing of a downlink signal from a specific beam pair or a specific BS has been changed but information about a changed TA value is not received from the specific BS or when a received TA value has been used but uplink timing is not adjusted as much as the downlink timing is changed, the radio frame alignment unit 513 can decide an arbitrary TA value.

The transmission/reception unit 520 can transmit/receive data and signal with a BS. The transmission/reception unit 520 can receive a control signal for a sounding reference signal from the BS. The received control signal for the sounding reference signal can include a flag indicating the permission or non-permission of change of transmission order of radio frames. Further, the transmission/reception unit 520 can transmit the sounding reference signal to at least one BS through an aligned continuous plurality of radio frames in accordance to the control of the control unit 510. At this time, the aligned continuous plurality of radio frames can be transmitted to different BSs or can be transmitted to one BS through a plurality of beams.

Meantime, the control unit 560 of the reception node 550 can perform the general control of the reception node 550. The control unit 560 can perform control and processing for deciding TA for an electronic device or TA for a plurality of beams of the electronic device and can transmit the decided TA to the corresponding electronic device. Also, when the reception node 550 needs channel estimation with the electronic device, the reception node 550 can generate a control signal requesting the electronic device 500 to transmit a sounding reference signal. At this time, the control unit 560 can include in the control signal for the sounding reference signal a flag indicating the permission or non-permission of change of transmission order of radio frames of the electronic device. Further, the control unit 560 can include in the control signal for the sounding reference signal the transmission order of a continuous plurality of radio frames.

On the basis of a signal received from an electronic device or a specific transmission beam of the electronic device through the transmission/reception unit 520, the TA decision unit 561 can estimate TA for the electronic device or the transmission beam of the electronic device.

The radio frame alignment control unit 563 can decide whether the electronic device will permit the change of transmission order of radio frames. The radio frame alignment control unit 563 can include in a control signal for a sounding reference signal a flag indicating the permission or non-permission of change of transmission order of radio frames. The radio frame alignment control unit 563 can determine if an operation to be performed using a sounding reference radio frame received from the electronic device is affected by the transmission order of the radio frames of the electronic device. If the operation to be performed is affected by the transmission order of the radio frames of the electronic device, the radio frame alignment control unit 563 may not permit the electronic device to change the transmission order of the radio frames. On the other hand, if the operation to be performed is not affected by the transmission order of the radio frames of the electronic device, the radio frame alignment control unit 563 can permit the electronic device to change the transmission order of the radio frames. For example, a BS can receive sounding reference radio frames from different transmission beams of the electronic device and estimate a channel for each transmission beam, and can select an optimal transmission beam or a specific beam on the basis of the channel estimation result and transmit an index indicating the reception order of sounding reference radio frames corresponding to the selected beam to the electronic device. At this time, because the BS has only to transmit to the electronic device the reception order of the sounding reference radio frames corresponding to the selected beam, no problem can occur although the electronic device changes the transmission order of the sounding reference radio frames. Accordingly, the BS can set a 'FLAG_ORDER_CHANGE' value to '1' and permit the electronic device to change the transmission order of the radio frames. In a system in which a plurality of BS cooperate, it can be assumed that a main BS denotes a BS taking charge of transmission/reception of a control signal among the plurality of BSs capable of transmitting/receiving signals with the electronic device, and sub BSs can denote the remnant BSs. At this time, the main BS can request a corresponding electronic device to transmit a plurality of sounding reference radio frames to the plurality of BSs. In this case, because the BSs to receive the plurality of sounding reference radio frames are different from one another, the main BS can determine that the electronic device cannot arbitrarily change the transmission order of the sounding reference radio frames, and sets a 'FLAG_ORDER_CHANGE' value to '0', thus enabling the electronic device to transmit a plurality of sounding reference signals in accordance to the transmission order of the sounding reference radio frames predefined with the plurality of BSs.

Further, the radio frame alignment control unit 563 can include in a control signal information about the transmission order of sounding reference radio frames to be used by the electronic device. For example, in a system in which a plurality of BSs cooperate, the main BS can set a 'FLAG_ORDER_CHANGE' value to '0' to indicate not permitting the electronic device to arbitrarily change the transmission order of the sounding reference radio frames, and include in a control signal information about the transmission order of the sounding reference radio frames to be used by the electronic device. At this time, the main BS can transmit to the sub BSs the information about the transmission order of the sounding reference radio frames, thereby enabling the respective sub BSs to be aware of the reception timing of the sounding reference radio frames from the corresponding electronic device. After a BS estimates a channel quality for a specific beam pair of the electronic device over several sub frames or frames, and extracts and uses an average of the estimated values or values other than the average, the BS can set the 'FLAG_ORDER_CHANGE' value to '0' to indicate not permitting the change of transmission order of sounding reference radio frames, and include in a control signal information about the transmission order of the sounding reference radio frames to be used by the electronic device.

The transmission/reception unit 570 can transmit/receive data and signal with the electronic device. In detail, the transmission/reception unit 570 can transmit a control signal for a sounding reference signal to the electronic device. The transmitted control signal for the sounding reference signal can include a flag indicating the change or non-change of transmission order of radio frames. Further, the control signal for the sounding reference signal can also include the transmission order of a continuous plurality of radio frames.

Figure 6:
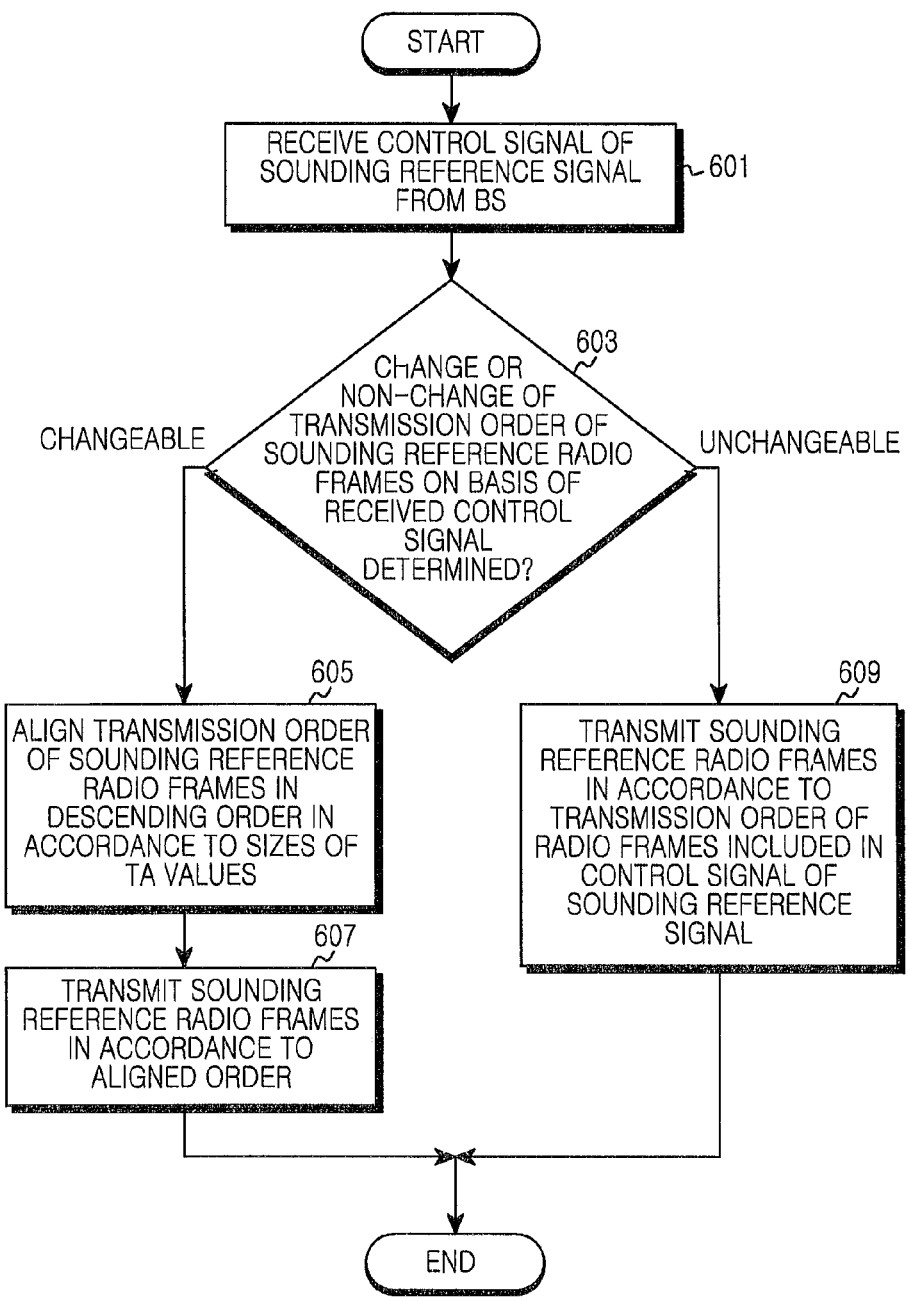
FIG. 6 is an example flowchart illustrating a transmission of sounding reference radio frames when the transmission order of the sounding reference radio frames is included in a control signal of a sounding reference signal in an electronic device according to this disclosure.

FIG. 6 illustrates an example procedure of a transmission of sounding reference radio frames when the transmission order of the sounding reference radio frames is included in a control signal of a sounding reference signal in an electronic device 500 according to this disclosure.

Referring to FIG. 6, in process 601, the electronic device 500 can receive a control signal for a sounding reference signal from a BS. At this time, the received control signal for the sounding reference signal can be a signal requesting the transmission of sounding reference radio frames.

Next, the electronic device 500 proceeds to process 603 and can determine the change or non-change of transmission order of the sounding reference radio frames, on the basis of the received control signal. At this time, the electronic device 500 can decide if it is permitted that the electronic device 500 changes the transmission order of the sounding reference radio frames, using tag information included in the received control signal.

If the change of transmission order of the sounding reference radio frames is permitted, the electronic device 500 proceeds to process 605 and can align the transmission order of a continuous plurality of radio frames that will transmit the sounding reference signal, in descending order in accordance to the sizes of TA values. In other words, the electronic device 500 can confirm a tag of the control signal for the sounding reference signal received from the BS. If the confirmed tag indicates that the change of the transmission order of the sounding reference radio frames is permitted, the electronic device 500 can confirm a TA value of each of the sounding reference radio frames from the control signal, and align the transmission order of the sounding reference radio frames in descending order in accordance to the sizes of the confirmed TA values. For example, if a flag 'FLAG_ORDER_CHANGE' value of the received control signal is equal to '1', the electronic device 500 can determine that the change of the transmission order of the sounding reference radio frames is permitted, and can confirm $T_{TA(a)}$, $T_{TA(b)}$, and $T_{TA(c)}$ being TA values of respective continuous uplink radio frame (a), uplink radio frame (b), and uplink radio frame (c) that will transmit the sounding reference signal. At this time, the electronic device 500 can confirm that the $T_{TA(a)}$, $T_{TA(b)}$, and $T_{TA(c)}$ satisfy relationship of $T_{TA(c)} > T_{TA(a)}$ $T_{TA(b)}$ and align a continuous plurality of uplink radio frames in order of 'uplink radio frame (c), uplink radio frame (a), and uplink radio frame (b)' in accordance to the TA values, thus deciding to transmit the continuous plurality of uplink radio frames in the aligned order. For another example, if the tag of the control signal for the sounding reference signal received from the BS indicates that the change of the transmission order of the sounding reference radio frame is permitted, the electronic device 500 may align by determining transmission order of the continuous plurality of radio frames based on the TA values and the offset values. The offset value is a value subtracting the reception timing of a corresponding downlink radio frame from the reception timing of specific downlink radio frame. For example, the electronic device 500 may align the three uplink radio frames based on the $T_{TA,m} + \alpha m$ values, as illustrated in FIG. 4B.

Next, the electronic device 500 can proceed to process 607 and transmit the sounding reference radio frames in accordance to the aligned order. At this time, the transmission timing of the sounding reference radio frames may not overlapped with each other, because the electronic device 500 aligns and transmits the sounding reference radio frames in order in which the TA values are large (such as based on the size of the TA values). After that, the electronic device 500 can terminate the procedure.

On the other hand, if the change of the transmission order of the sounding reference radio frames is not permitted in process 603, the electronic device can proceed to process 609 and transmit the sounding reference radio frames in accordance to the transmission order of the sounding reference radio frames included in the control signal for the sounding reference signal. At this time, the control signal of the sounding reference signal can include information about the transmission order of the sounding reference radio frames of the electronic device 500. In other words, the electronic device 500 can confirm a tag of the control signal for the sounding reference signal received from the BS. If the confirmed tag indicates that the change of the transmission order of the sounding reference radio frames is not permitted, the electronic device 500 can transmit the sounding reference radio frames in accordance to the transmission order of the sounding reference radio frames included in the control signal. For example, if the flag 'FLAG_ORDER_CHANGE' value of the received control signal is equal to '0', the electronic device 500 can determine that it cannot change the transmission order of the sounding reference radio frames on the basis of the TA values, and transmit the sounding reference radio frames to the BS in accordance to the transmission order of the sounding reference radio frames included in the control signal of the sounding reference signal. After that, the electronic device 500 can terminate the procedure.

Figure 7:
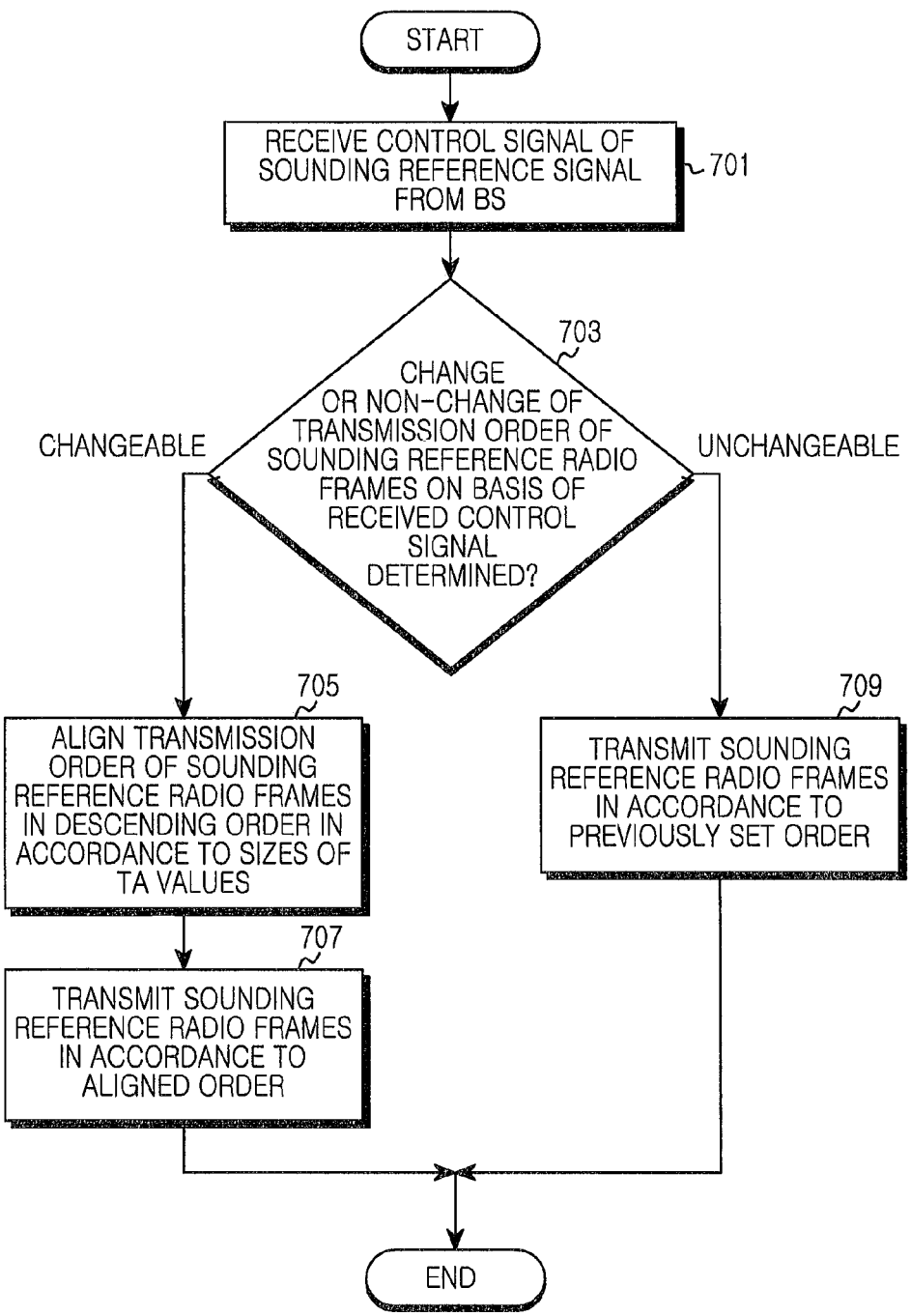
FIG. 7 is an example flowchart illustrating a transmission of sounding reference radio frames when the transmission order of the sounding reference radio frames is not included in a control signal of a sounding reference signal in an electronic device according to this disclosure.

FIG. 7 illustrates an example procedure of transmitting sounding reference radio frames when the transmission order of the sounding reference radio frames is not included in a control signal of a sounding reference signal in an electronic device 500 according to this disclosure.

Referring to FIG. 7, in process 701, the electronic device 500 can receive a control signal for a sounding reference signal from a BS. At this time, the received control signal for the sounding reference signal can be a signal requesting the transmission of sounding reference radio frames.

The electronic device 500 proceeds to process 703 and can determine the change or non-change of transmission order of the sounding reference radio frames, on the basis of the received control signal. At this time, the electronic device 500 can decide if it is permitted that the electronic device 500 changes the transmission order of the sounding reference radio frames, using tag information included in the received control signal.

If the change of transmission order of the sounding reference radio frames is permitted, the electronic device 500 proceeds to process 705 and can align the transmission order of a continuous plurality of radio frames that will transmit the sounding reference signal, in descending order in accordance to the sizes of TA values. In other words, the electronic device 500 can confirm a tag of the control signal for the sounding reference signal received from the BS. If the confirmed tag indicates that the change of the transmission order of the sounding reference radio frames is permitted, the electronic device 500 can confirm a TA value of each of the sounding reference radio frames from the control signal, and align the transmission order of the sounding reference radio frames in descending order in accordance to the sizes of the confirmed TA values. For example, if a flag 'FLAG_ORDER_CHANGE' value of the received control signal is equal to '1', the electronic device 500 can determine that the change of the transmission order of the sounding reference radio frames is permitted, and can confirm $T_{TA(a)}$, $T_{TA(b)}$ and $T_{TA(c)}$ being TA values of respective continuous uplink radio frame (a), uplink radio frame (b), and uplink radio frame (c) that will transmit the sounding reference signal. At this time, the electronic device 500 can confirm that the $T_{TA(a)}$, $T_{TA(b)}$, and $T_{TA(c)}$ satisfy relationship of $T_{TA(c)} > T_{TA(a)} > T_{TA(b)}$ and align a continuous plurality of uplink radio frames in order of 'uplink radio frame (c), uplink radio frame (a), and uplink radio frame (b)' in accordance to the TA values, thus deciding to transmit the continuous plurality of uplink radio frames in the aligned order. For another example, if the tag of the control signal for the sounding reference signal received from the BS indicates that the change of the transmission order of the sounding reference radio frame is permitted, the electronic device 500 may align by determining transmission order of the continuous plurality of radio frames based on the TA values and the offset values. The offset value is a value subtracting the reception timing of a corresponding downlink radio frame from the reception timing of specific downlink radio frame. For example, the electronic device 500 may align the three uplink radio frames based on the $T_{TA,m} + \alpha m$ values, as illustrated in FIG. 4B.

Next, the electronic device 500 can proceed to process 707 and can transmit the sounding reference radio frames in accordance to the aligned order. At this time, the transmission timing of the sounding reference radio frames may not overlapped with each other, because the electronic device 500 can align and transmit the sounding reference radio frames in order in which the TA values are large (such as based on the size of the TA values). After that, the electronic device 500 can terminate the procedure.

On the other hand, if the change of the transmission order of the sounding reference radio frames is not permitted in process 703, the electronic device can proceed to process 709 and can transmit the sounding reference radio frames in accordance to a previously set order. At this time, the transmission order of the sounding reference radio frames can be previously set and stored. In other words, the electronic device 500 can confirm a tag of the control signal for the sounding reference signal received from the BS. If the confirmed tag indicates that the change of the transmission order of the sounding reference radio frames is not permitted, the electronic device 500 can transmit the sounding reference radio frames in accordance to the previously set transmission order of the sounding reference radio frames. For example, if the flag 'FLAG_ORDER_CHANGE' value of the received control signal is equal to '0', the electronic device 500 can determine that it cannot change the transmission order of the sounding reference radio frames on the basis of the TA values, confirm the previously stored transmission order of the sounding reference radio frames, and transmit the sounding reference radio frames to the BS in accordance to the confirmed order. After that, the electronic device 500 can terminate the procedure.

Figure 8:
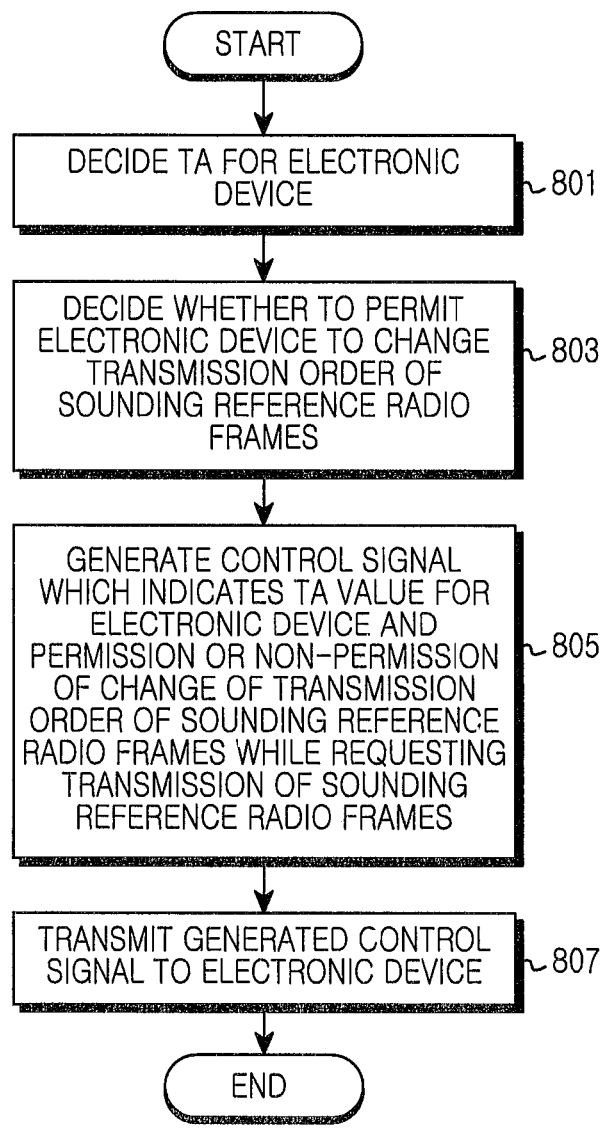
FIG. 8 is an example flowchart illustrating a method to be implemented by a reception node according to this disclosure.

FIG. 8 illustrates an example procedure of a reception node according to this disclosure. Here, for description convenience, a description is made assuming that the reception node is a BS. But, in accordance to an exemplary embodiment, the reception node can be also a counterpart electronic device communicating with the electronic device.

Referring to FIG. 8, in process 801, the reception node can decide TA for an electronic device. That is, a BS being the reception node estimates TA for uplink synchronization of each electronic device, on the basis of a signal received from each of a connected plurality of electronic devices.

After that, in process 803, the reception node can decide whether to permit the electronic device to change the transmission order of sounding reference radio frames. That is, the reception node can decide whether to permit the electronic device to change the transmission order of the sounding reference radio frames, on the basis of TA values. At this time, the reception node can determine if an operation to be performed using the sounding reference radio frames received from the electronic device is affected by the transmission order of the sounding reference radio frames of the electronic device (or the reception order of the sounding reference radio frames of the BS). If the operation to be performed is affected by the transmission order of the sounding reference radio frames of the electronic device, the reception node may not permit the electronic device to change the transmission order of the sounding reference radio frames. On the other hand, if the operation to be performed is not affected by the transmission order of the sounding reference radio frames of the electronic device, the reception node can permit the electronic device to change the transmission order of the sounding reference radio frames.

Next, in process 805, the reception node can generate a control signal which indicates a TA value for the electronic device and the permission or non-permission of a change of transmission order of sounding reference radio frames, while requesting the transmission of the sounding reference radio frames. After that, the reception node proceeds to process 807 and can transmit the generated control signal to the electronic device. Here, the reception node may not permit the electronic device to change the transmission order of the sounding reference radio frames on the basis of the TA values, and can include in the control signal the transmission order of the sounding reference radio frames desired by the reception node and transmit the control signal to the electronic device.

Figure 9:
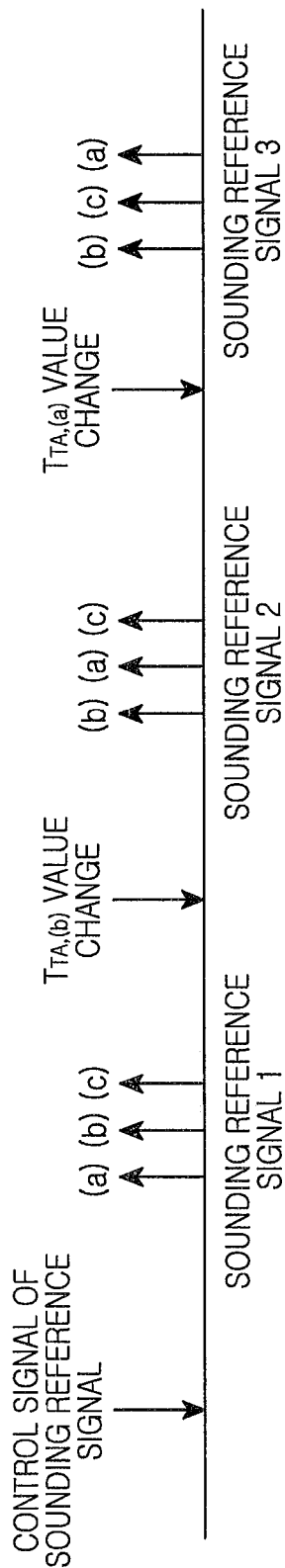
FIG. 9 is an example diagram illustrating a changing of the transmission order of sounding reference radio frames in accordance to changing TA values in an electronic device according to this disclosure.

FIG. 9 illustrates an example of changing the transmission order of sounding reference radio frames in accordance to changing TA values in an electronic device according to this disclosure.

Referring to FIG. 9, a BS can periodically request the electronic device to transmit three sounding reference radio frames (a), (b), and (c), while transmitting to the electronic device a control signal permitting the change of the transmission order of the three sounding reference radio frames. Particularly, the BS can transmit $T_{TA(a)}$, $T_{TA(b)}$, and $T_{TA(c)}$ satisfying $T_{TA(a)} > T_{TA(b)} > T_{TA(c)}$ through the control signal at an initial time. If so, the electronic device can align TA values for the three sounding reference radio frames in descending order, and transmit the sounding reference radio frames in order of (a), (b), and (c). After that, if the BS can transmit a control signal requesting to increase a value of $T_{TA(b)}$ after again estimating TA values for the three sounding reference radio frames, the electronic device can confirm that the TA values for the three sounding reference radio frames satisfy $T_{TA(b)} > T_{TA(a)} > T_{TA(c)}$, and align the TA values for the three sounding reference radio frames in descending order, and transmit the three sounding reference radio frames in order of (b), (a), and (c). After that, if the BS transmits a control signal requesting to decrease a value of $T_{TA(a)}$ after again estimating TA values for the three sounding reference radio frames, the electronic device can confirm that the TA values for the three sounding reference radio frames satisfy $T_{TA(b)} > T_{TA(c)} > T_{TA(a)}$, and align the TA values for the three sounding reference radio frames, and transmit the three sounding reference radio frames in order of (b), (c), and (a).

Exemplary embodiments of this disclosure and all function operations described herein can be implemented by computer software including structures disclosed in the present specification and equivalent structures thereof, firmware, hardware or a combination of one or more of them. Also, the exemplary embodiments of this disclosure can be implemented by one or more computer program products, such as data processing devices, or can be implemented by one or more modules of computer program instructions encoded on a computer-readable medium for controlling operations of these devices.

The computer-readable medium can be a machine-readable storage medium, a machine-readable storage substrate, a memory device, a construction of substance affecting a machine-readable radio wave stream, or a combination of one or more of them. The term of data processing device includes, for example, all data processing equipment, devices and machines including a programmable processor or computer or a multi-processor or computer. The equipment can include a code added to hardware and generating an execution environment for a corresponding computer program, for example, a code constructing a processor firmware, a protocol stack, a database management system, an operating system, or a combination of one or more of them.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting a continuous plurality of radio frames in an electronic device, the method comprising:
    obtaining timing advancement (TA) values corresponding to the continuous plurality of radio frames;
    determining a transmission order of the continuous plurality of radio frames based on the TA values, wherein the transmission order comprises a successive transmission order; and
    transmitting the continuous plurality of radio frames according to the determined transmission order.

2. The method of claim 1, wherein determining the transmission order of the continuous plurality of radio frames based on the TA values comprises aligning the continuous plurality of radio frames in a descending order based on a size of the TA values.

3. The method of claim 1, wherein determining the transmission order of the continuous plurality of radio frames on the basis of the TA values comprises aligning the continuous plurality of radio frames based on a size of the TA value of each of the continuous plurality of uplink radio frames and an offset value of each of the continuous plurality of uplink radio frames, wherein the offset value is a value subtracting the reception timing of a corresponding downlink radio frame from the reception timing of specific downlink radio frame.

4. The method of claim 1, further comprising receiving a signal requesting the transmission of the continuous plurality of radio frames, wherein the signal comprises information indicating whether to permit a change of the transmission order of the continuous plurality of radio frames, wherein determining the transmission order comprises:
    if the signal indicates a permission of the change of the transmission order of the continuous plurality of radio frames, determining the transmission order of the continuous plurality of radio frames based on the TA values; and
    if the signal indicates the non-permission of the change of the transmission order of the continuous plurality of radio frames, determining the transmission order of the continuous plurality of radio frames in the transmission order of the radio frames comprised in the signal or a preset order.

5. The method of claim 1, wherein the continuous plurality of radio frames are a continuous plurality of uplink sounding reference radio frames.

6. The method of claim 1, wherein transmitting the continuous plurality of radio frames according to the determined order comprises transmitting each of the continuous plurality of radio frames to a different Base Station (BS) according to the determined transmission order.

7. The method of claim 1, wherein transmitting the continuous plurality of radio frames according to the determined order comprises transmitting each of the continuous plurality of radio frames to one BS through a different plurality of beams according to the determined transmission order.

8. The method of claim 1, wherein transmitting the continuous plurality of radio frames according to the determined order comprises transmitting each of the continuous plurality of radio frames to a different electronic device according to the determined transmission order.

9. A method for receiving a continuous plurality of radio frames in a reception node, the method comprising:
    determining a timing advancement (TA) value for synchronization of an electronic device based on a signal received from the electronic device;
    determining whether to permit a change of a transmission order of the continuous plurality of radio frames to be transmitted by the electronic device; and
    transmitting, to the electronic device, information on the TA value and information on the change of the transmission order of the continuous plurality of radio frames.

10. The method of claim 9, wherein determining whether to permit the change of the transmission order of the continuous plurality of radio frames comprises determining whether to permit the change of the transmission order aligning the continuous plurality of radio frames based on whether an operation to be performed using radio frames received from the electronic device is affected by an order in which the electronic device transmits the continuous plurality of radio frames.

11. An electronic device for transmitting a continuous plurality of radio frames, the electronic device comprising:
    a transceiver configured to obtain timing advancement (TA) values corresponding to the continuous plurality of radio frames; and
    a controller configured to:
        determine a transmission order of the continuous plurality of radio frames based on the TA values, wherein the transmission order comprises a successive transmission order, and
        transmit the continuous plurality of radio frames according to the transmission order.

12. The electronic device of claim 11, wherein the controller is configured to align the continuous plurality of radio frames in a descending order based on the size of the TA values.

13. The electronic device of claim 11, wherein the controller is configured to align the continuous plurality of radio frames based on the a size of the TA value of each of the continuous plurality of uplink radio frames and an offset value of each of the continuous plurality of uplink radio frames, wherein the offset value is a value subtracting a reception timing of a corresponding downlink radio frame from a reception timing of a specific downlink radio frame.

14. The electronic device of claim 11, wherein the transceiver is configured to receive a signal requesting a transmission of the continuous plurality of radio frames, wherein the signal comprises information indicating a change of the transmission order of the continuous plurality of radio frames, wherein the controller is configured to:
    determine the transmission order of the continuous plurality of radio frames on the basis of the TA values if the control signal indicates a permission of the change of the transmission order of the continuous plurality of radio frames, and
    determine the transmission order of the continuous plurality of radio frames in the transmission order of the radio frames comprised in the signal or a preset order if the control signal indicates a non-permission of the change of the transmission order of the continuous plurality of radio frames.

15. The electronic device of claim 11, wherein the continuous plurality of radio frames are a continuous plurality of uplink sounding reference radio frames.

16. The electronic device of claim 11, wherein the transceiver is configured to transmit each of the continuous plurality of radio frames to a different BS according to the transmission order.

17. The electronic device of claim 11, wherein the transceiver is configured to transmit each of the continuous plurality of radio frames to one BS through a different plurality of beams according to the transmission order.

18. The electronic device of claim 11, wherein the transceiver is configured to transmit each of the continuous plurality of radio frames to a different electronic device according to the transmission order.

19. A reception node to receive a continuous plurality of radio frames, the reception node comprising:
 a controller configured to:
  determine a timing advancement (TA) value for an uplink synchronization of an electronic device based on a signal received from the electronic device, and
  determine whether to permit a change of a transmission order of the continuous plurality of radio frames to be transmitted by the electronic device; and
 a transceiver configured to transmit, to the electronic device, information on the TA value and information on whether to permit the change of the transmission order of the continuous plurality of radio frames.

20. The reception node of claim 19, wherein the controller is configured to determine whether to permit a change of the transmission order for aligning the continuous plurality of radio frames to be transmitted by the electronic device based on whether an operation to be performed using radio frames received from the electronic device is affected by an order in which the electronic device transmits the continuous plurality of radio frames.

* * * * *